United States Patent [19]

Evtuhov

[11] 4,278,948
[45] Jul. 14, 1981

[54] AUTOPOINTING LASER SYSTEM

[75] Inventor: Viktor Evtuhov, Pacific Palisades, Calif.

[73] Assignee: The United States of America as represented by the Secretary of the Air Force, Washington, D.C.

[21] Appl. No.: 937,016

[22] Filed: Aug. 25, 1978

Related U.S. Application Data

[63] Continuation-in-part of Ser. No. 716,307, Aug. 20, 1976, abandoned.

[51] Int. Cl.$^2$ ............................................. H01S 3/081
[52] U.S. Cl. .................................. 331/94.5 C; 350/299
[58] Field of Search ...................... 331/94.5 C, 94.5 D, 331/94.5 G, DIG. 1; 330/4, 3; 356/5; 350/299

[56] References Cited

U.S. PATENT DOCUMENTS

| | | | |
|---|---|---|---|
| 3,644,042 | 2/1972 | Kolb et al. | 331/94.5 C |
| 3,733,129 | 5/1973 | Bridges | 356/5 |
| 3,958,881 | 5/1976 | Keene et al. | 331/DIG. 1 |
| 3,968,456 | 7/1976 | Welch | 331/94.5 C |

OTHER PUBLICATIONS

Linford et al., Very Long Lasers Applied Optics, vol. 13, No. 2, (Feb. 1974), pp. 379–390.

Primary Examiner—William L. Sikes
Attorney, Agent, or Firm—Joseph E. Rusz; Arsen Tashjian

[57] ABSTRACT

An autopointing laser system utilized in the tracking and/or detection of objects having a stationary flat reflector, a pair of parabolic reflectors, and a telescope reflector, all in optical alignment with each other. When the telescope reflector is also in optical alignment with the object to be tracked and/or detected these elements combine to act as the optical resonator of the laser system. As a result of the above arrangement, the lasing medium located between the pair of parabolic reflectors will continue to oscillate as long as the object remains in the field of view of the telescope reflector thereby providing an automatic tracking operation.

6 Claims, 2 Drawing Figures

AUTOPOINTING LASER SYSTEM

STATEMENT OF GOVERNMENT INTEREST

The invention described herein may be manufactured and used by or for the Government for governmental purposes without the payment of any royalty thereon.

BACKGROUND OF THE INVENTION

This application is a continuation-in-part of U.S. Patent Application Ser. No. 716,307 of Viktor Evtuhov filed Aug. 20, 1976 and now abandoned.

This invention relates generally to lasers, and, more particularly, to an autopointing laser system which permits the laser to continue to oscillate as the tracked or detected object is moved within a range of angles and orientations.

Light amplification by stimulated emission of radiation (laser) has extended the range of controlled electromagnetic radiation to the infrared and visible light spectrum. A laser produces a beam of coherent electromagnetic radiation having a particular well-defined frequency in that region of the spectrum broadly described as optical. This range includes the near ultraviolet, the visible and the infrared. The coherence of the beam is particularly important because it is that property which distinguishes laser radiation from ordinary optical beams. On account of its coherence, a laser beam has remarkable properties which set it apart from ordinary light which is incoherent.

Coherence, the essential property of lasers, is of two kinds: spatial and temporal. A wave is spatially coherent over a time interval if there exists a surface over which the phase of the wave is the same (or is correlated) at all points. A wave is time-coherent at an infinitesimal area on a receiving surface if there exists a periodic relationship between its amplitude at any one instant and its amplitude at later instants of time. Perfect time coherence is an ideal since it implies perfect monochromaticity, something which is forbidden by the uncertainty principle.

Laser beams have a number of remarkable properties. Because of their spatial coherence, they have an extremely small divergence and are therefore highly directional. A laser beam, because it possesses space coherence, can be focused to form a spot whose diameter is of the order of one wave length of the laser light itself. Enormous power densities are thus attainable. For example, the focused output of a 50-kilowatt infrared burst from a laser can have a radiant power density of the order of $10^{12}$ watts/cm$^2$, this is about 100 million times the power density at the surface of the sun. Extraordinarily high temperatures, orders of magnitude greater than that at the sun, can be generated at the small area which absorbs this concentrated radiation. Furthermore, since the electric field strength of an electromagnetic wave is proportional to the square root of its intensity, the field at the focus of the laser beam is millions of volts per centimeter.

The most promising potential of lasers comes from time coherence. It is this property which permits exploitation of radio and microwaves for communications. However, laser frequencies are millions of times higher than radio frequencies, and hence are capable of carrying up to millions of times more information. In fact, one single laser beam has in principle more information-carrying capacity than all the combined radio and microwave frequencies in use at the present time.

Accordingly, systems applications of lasers are useful for communication in space, on earth and undersea. Military surveillance and weapons systems, mapping, medical, and computer technology may also include lasers.

Since the development of the first working lasers, considerable time and effort has been expended in the search for higher output laser systems. The possible applications of high power lasers are unlimited in the fields of communication, manufacturing, construction, medicine, space exploration, and defense. Unfortunately many obstacles exist to the attainment of high power systems. Most lasers have a low efficiency and therefore to obtain high power or high energy outputs, considerably more energy must be furnished to the system than is extracted. If this energy furnished is electrical, then the system cannot have a large average power and still be portable, as is desired in some cases. The relative size and weight of laser systems, and the availability of materials, have also introduced obstacles to their development.

Gas laser operation requires that a population inversion be established between upper energy levels and lower energy levels of the lasing medium. One example of such a laser would be the carbon dioxide-nitrogen laser. Recently it has been shown that photon emission in gas lasers necessary for laser operation may be achieved by the resonant transfer of energy, through collisions, from a first gaseous substance, designated the "energizing substance" such as vibrationally excited molecular nitrogen ($N_2$), to a second substance designated the "lasing substance" such as carbon dioxide ($CO_2$). Furthermore, it has been demonstrated that nitrogen and $CO_2$ may be fully mixed together, such as in a fully mixed gaseous plasma, while the substances in this mixture are raised to respective specific energy levels, favorable to laser emission, as a result of the electron collisions in an electronic plasma. Also, it is known that one can combust a complex substance such as cyanogen so as to generate carbon dioxide and molecular nitrogen with the molecular nitrogen in a highly energized state favorable to energizing the $CO_2$ for laser emission. In either case, it is necessary that the nitrogen have sufficient energy in its vibrational mode so as to impart a substantial amount of energy to $CO_2$ in the 001 state, which is commonly referred to as the upper laser level for $CO_2$ molecules. The very efficient energy transfer between the nitrogen and the carbon dioxide results from a near identity of the energy spacing of certain of the vibrational states of these two substances.

Thus, in the present state of the high power gas laser art, lasing (which is the coherent stimulated emission of quanta of light energy) of one substance results from that substance being brought to a high, nonequilibrium energy state as a result of collisions with an energizing gas excited to a vibrational energy level which closely matches an energy level of the lasing substance (i.e., the upper lasing level in $CO_2$). Simply stated, at least one $CO_2$ molecule which is present in a region of population inversion will spontaneously emit a photon with an energy equal to the difference between the upper laser energy level and lower laser energy level for a $CO_2$ molecule. This is a quantum of light energy which is reflected back and forth in the optical cavity. The photon will impinge on another $CO_2$ molecule and cause a rapid, stimulated emission of a second photon. This photon is also reflected back and forth in the optical cavity, and so forth which brings about a continuing avalanche of stimulated photon emission, at the lasing wavelength. This sequence will occur nearly instantaneously so that lasing is established in say, nanoseconds. The useful laser output is derived by coupling light energy out of the oscillating and/or amplifying optical resonator.

In many applications it is desired to direct a laser beam at a moving object. In the prior art, moving objects were tracked by moving a telescope or other optical elements external to the laser resonator in a manner causing the generated laser beam to follow the object. Such systems required considerable additional equipment in order to monitor the motion of the object and control the movable optical element accordingly. In addition, since lasers require optical resonators, it becomes extremely difficult to continue the required laser oscillation if one of the reflectors is moved randomly.

SUMMARY OF THE INVENTION

The instant invention overcomes the problems set forth hereinabove by providing an autopointing laser system which utilizes the object to be tracked or detected as one of the reflectors of the optical resonator. The optical resonator of the laser system of the instant invention is designed so that the laser will continue to oscillate as the object moves over a range of locations. Thus, the laser system of this invention is capable of tracking a moving object automatically, and, in addition, is considerably simpler, smaller and less expensive than the laser tracking systems of the prior art.

By utilizing the object as one of the resonator reflectors, the presence of the target within a certain range will permit the lasing medium within the laser system to continue to oscillate. The major advantage of such a mode of operation is that the laser beam will track the target within certain limits and thereby substantially reduce the accuracy requirements necessary in the systems of the past. Such an operation may be referred to as autopointing.

The laser system of the instant invention is made up of a stationary, flat reflector and a pair of parabolic reflectors (i.e. paraboloids of revolution) which are coaxial and confocal with a common focus at a point located substantially at the center of a telescope reflector. The telescope reflector faces the distant object to be tracked and this object serves as the end reflector of the optical resonator of the instant invention. The lasing medium, which is in the form of a gas, flows between the parabolic reflectors as in conventional gas dynamic lasers.

In an alternate embodiment of the invention a movable reflector can be disposed in the laser light path between the parabolic reflectors and the telescope reflector. In such an embodiment oscillation by the lasing medium is possible within the optical resonator of the instant invention at even greater ranges of the target or object.

It is therefore an object of this invention to provide a laser system which is capable of effectively tracking and/or detecting an object.

It is another object of this invention to provide a laser system with increased tracking capability by utilizing the object to be tracked as one of the reflective surfaces of the resonator of the laser system.

It is still another object of this invention to provide a laser system which is capable of automatically tracking a moving target.

It is a further object of this invention to provide a laser system for tracking and/or detecting an object which is economical to produce, simple in construction and which utilizes conventional currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DETAILED DESCRIPTION OF PREFERRED EMBODIMENTS

Figure 1:
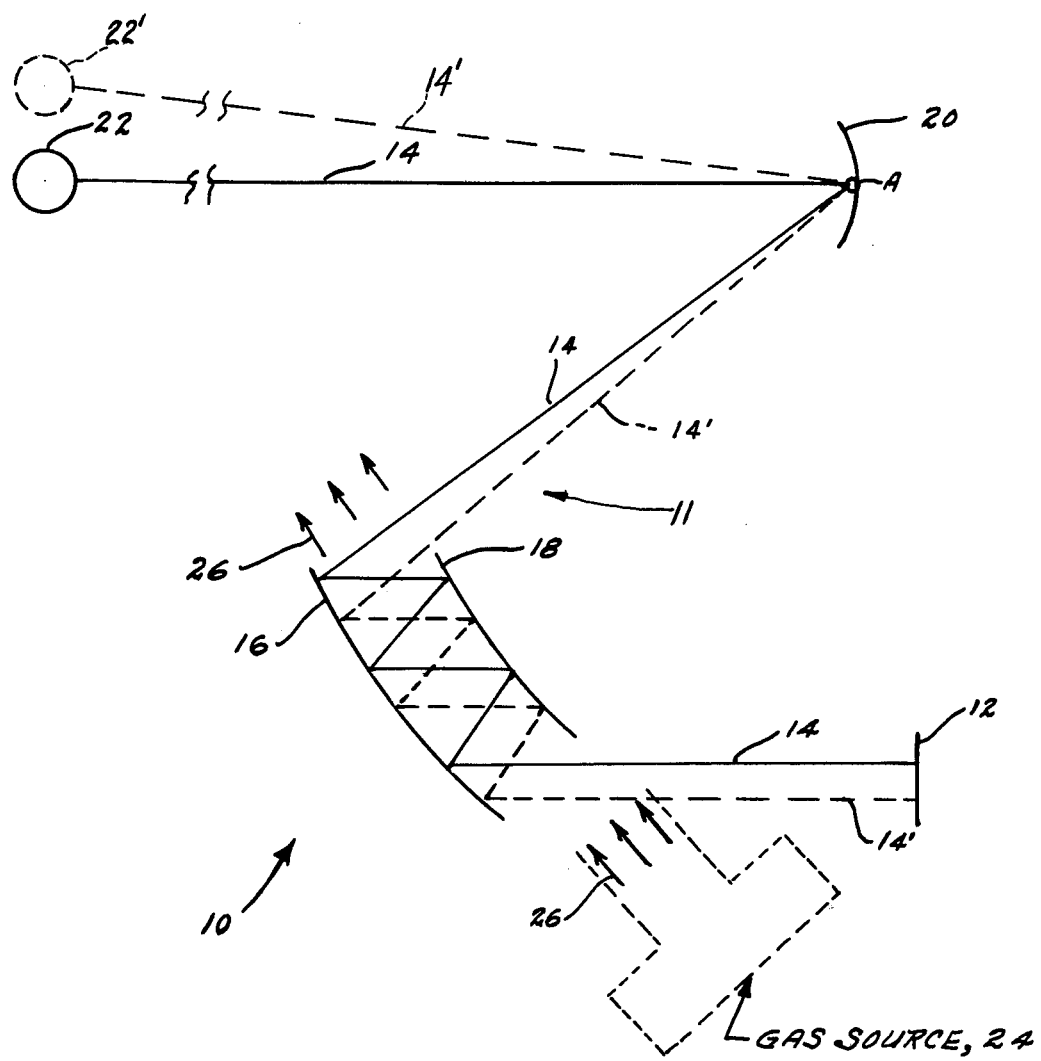
FIG. 1 of the drawing is a schematic representation of the autopointing laser system of this invention.

Reference is now made to FIG. 1 of the drawing which shows the autopointing laser system 10 of this invention. Since laser system 10 of this invention operates essentially as a conventional gas dynamic laser, and the operation of the gas dynamic laser is well known in the art, it will not be set forth in detail. The essential components of laser system 10 reside within its optical resonator 11. Resonator 11 contains therein a stationary flat reflector 12 which is optically aligned with a pair of conventional parabolic reflectors 16 and 18 (i.e., paraboloids of revolution). Reflector 12 is disposed so that light rays 14 from parabolic reflector 16 are incident upon reflector 12 in a direction perpendicular to its reflective surface. Parabolic reflector 18, which is optically aligned with parabolic reflector 16, enables light rays 14 to reflect between the surfaces of parabolic reflectors 16 and 18. In addition, parabolic reflectors 16 and 18 are confocal having a common focus at point A which is located substantially at the center of a conventional telescope reflector 20. That is, reflectors 16 and 18 are disposed along respective parabolic surfaces which have a common focus and a common axis. Telescope reflector 20 faces a distant reflective object 22 to be tracked or detected, and it is this distant object or target 22 which serves as the other end reflector of the optical resonator 11 of laser system 10 of this invention.

As in any conventional flowing gas laser the lasing medium, in the form of a gas, emanates from source 24 and flows between parabolic reflectors 16 and 18 in a direction indicated by arrows 26 and shown schematically in the drawing. The laser system 10 of this invention operates in a conventional, well known manner utilizing for example, a lasing gas such as $CO_2$, a nozzle array (not shown) upstream from the parabolic reflectors 16 and 18 and a diffuser (not shown) downstream from reflectors 16 and 18.

Reflectors 16 and 18 are constructed with a spacing and curvature determined by the design characteristic of the laser and the desired number of light rays reflected between reflectors 16 and 18. The extent or length of the reflectors 16 and 18 along the laser gas flow direction 26 is determined by the properties of the lasing medium or gas in accordance with well known flowing gas laser design.

The one limitation placed on parabolic reflector 16 within optical resonator 11 is that the extent of reflector 16 along the gas flow direction 26 be greater than the extent of reflector 18 in the same direction in order to permit light rays 14 leaving point A over a range of angles to impinge upon parabolic reflector 16.

In operation, when the distant object 22 is in the position shown in the drawing, light rays 14 traverse resonator 11 along the path shown by the solid line. This light ray 14 is incident upon stationary reflector 12 perpendicular to its reflective surface providing a regenerative light path through the laser gas and enabling the laser oscillation to continue. When the object 22 has moved to a new location designated as 22' and shown by the dotted lines, as long as this location is within the field of view of the telescope reflector 20, light ray 14' traverses the optical resonator 11 of the laser system 10 of this invention along the path shown by the dotted lines. Since this light ray 14' also remains incident upon stationary reflector 12 in a direction perpendicular to its reflective surface, a regenerative light path through the laser gas is still provided and the laser continues to oscillate. Since the object 22 to be tracked serves as one of the reflectors of the optical resonator 11, laser system 10 will continue to oscillate as object 22 moves over a range of locations. As a result laser system 10 is capable of automatically tracking object 22.

To be more concise, the two confocal parabolic reflectors 16 and 18 and flat reflector 12 of laser system 10 of this invention arranged in the manner shown in the drawing constitute an effective retro-reflector. In other words, radiation coming from any direction within the field of view of system 10 will be returned back in that direction after passing through the optical arrangement (and being amplified). Thus, only the relative alignment of the two parabolic mirrors 16 and 18 and the flat mirror 12 is important, not the alignment of the whole arrangement relative to the distant reflective object 22. In this respect the arrangement is functionally similar to a self-aligning retro-reflector.

Moreover, because of the absence of aperture limitations imposed by a long tube containing the laser medium as in the past, optical alignment problems are substantially reduced. Furthermore, to obtain adequate gain, the optical path is folded through the gain medium, thereby effectively providing a very long amplification path. Such a procedure is well recognized practice as substantiated by a paper by S. N. B. Murphy, "Gas-Dynamic and Chemical Lasers: Gas Dyanmic", *High Power Gas Lasers* edited by E. R. Pike, Institute of Physics Conference Series, paper no. 29, 1976, pages 222-242; and pages 53-61 and pages 133-144 from a book by John D. Anderson, Jr., *Gas Dynamic Lasers: An Introduction*, Academic Press, 1976.

In addition, distant reflection object 22 does not have any stringent requirements on it since all it need do is return adequate energy to the laser medium to sustain oscillation. It can move anywhere within the field of view of the optical system since, as was pointed out above, the optical arrangement of two confocal parabolic reflectors 16 and 18 and a flat reflector 12 is not sensitive to the direction from which the returned energy is coming, as long as it is within the system field of view. The required distant reflection can be formed by either a glint on or an area of diffuse reflectivity on distant object 22. Most objects of interest will have sufficiently strong glints or adequate diffuse reflectivity surfaces.

In order to demonstrate operability of the instant invention, the following analysis and exemplary calculations demonstrate that the typical physical parameters which one would encounter with a system according to the present invention, sufficient laser power can be returned from distant object 22 to readily enable laser oscillation to be sustained using gains available in existing gas dynamic lasers.

It is well known that to sustain oscillation in a laser the gain of the laser medium must equal or exceed the total laser resonator losses per pass. Thus, the actual amount of gain required by the system depends on the losses incurred in the process of transmitting to target or object 22 and back and on the losses in the optical system. Since object 22 contains a glint (whole classes of adaptive optics systems are based on the existence of glints—see, for example, the March 1977 special issue of the Journal of the Optical Society of America on Adaptive Optics), a glint is used in the following calculation. Specifically, a "normal" glint is postulated as described in the Table below. It should be noted that this is a very conservative choice of glint strength, since the assumed area of the glint is only 0.04 cm$^2$; and its reflectivity is only 50%.

TABLE (Normal Glint)

| | |
|---|---|
| Area of glint | $A_g = 0.04 \text{ cm}^2 = 4.0 \times 10^{-6} \text{ m}^2$ |
| Backscatter cone | $\theta_g = 1.0 \times 10^{-2} \text{ rad}$ |
| Reflectivity | $\rho = 0.5$ |
| Optical cross section | $S_T = 0.32 \text{ m}^2$ |
| Radius | $R_o = 0.451 \text{ m}$ |

The intensity per steradian $I_g$ backscattered from a glint is given by:

$$I_g = \frac{\rho P \left( \frac{A_g}{A_s} \right)}{\frac{\pi}{4} (\theta_g^2)} \quad (W/sr) \tag{1}$$

where
$\rho$ = glint reflectivity,
P = total incident power
$A_g$ = area of glint,
$A_s$ = spot size area of incident beam at glint, and
$\theta_g$ = full angle of glint return.
Defining a power density E by:

$$E = \frac{P}{A_s} \quad (W/m^2) \tag{2}$$

and an equivalent optical cross section $S_T$ of a specular sphere of 100% reflectivity by:

$$S_T = \frac{16 \rho A_g}{\theta_g^2} \quad (m^2) \tag{3}$$

and substituting Equations (2) and (3) in Equation (1) gives:

$$I_g = \frac{1}{4\pi} E S_T \tag{4}$$

The value of $S_T$ and its radius $R_o$ are given in the Table above.

The total collected backscattered power $P_B$ from a glint is simply:

$$P_B = I_g \frac{\pi}{4} \left( \frac{D}{Z_T} \right)^2 \quad (5)$$

where
D = Telescope diameter,
$Z_T$ = range to the target.

To explicitly take into account the aberrating effects of the atmosphere, Equation (5) can be rewritten as:

$$P_B = \frac{P}{K^2 \lambda^2} \left( \frac{D}{Z_T} \right)^4 \left( \frac{S_T}{4\pi} \right) \quad (6)$$

The aberration measure K of the atmosphere is 2.44 ($d_s/d_o$), given in terms of aberrated spot size $d_s$ divided by diffraction limited spot size $d_o$ for a uniformly illuminated aperture. By comparing this glint backscatter with a Lambertain backscatter from a diffuse target, it can be shown that the diffuse backscatter power can exceed the power of the small glint used in the foregoing Table if the diffuse surface area is greater than the effective optical cross section of the glint.

Using Equation (6), one can estimate the ratio of backscattered-to-transmitted power and set the reciprocal of this ratio equal to the laser gain necessary for oscillation, assuming no loss in the optical system. (It is well known that this loss is small compared to the losses being considered here and in the actual laser design can be easily added to these losses.) For a 1 m diameter telescope, an atmospherically degraded $CO_2$ laser beam (2× diffraction limit for a uniformly illuminated aperture, i.e., $d_s/d_o=2$), and a range $Z_T$ of 5 km, the return power can be estimated for a typical pulsed laser. With a 25 kJ pulse of 25 μsec duration, the return power is 17 W, and the necessary round trip gain is 78 dB. For a 2 m diameter telescope, the beam is more tightly focused, and there is also a greater collection aperture, so the required round trip gain is 66 dB. Since the beam passes through the amplifying medium twice, the required gain per pass is only 39 dB for a 1 m telescope and 33 dB for a 2 m telescope. Such gains are obtainable in gas dynamic lasers as substantiated by reference to the publication of Murphy and Anderson, Jr. cited above. In most situations, however, even lower gains should be adequate since much stronger glints than the one postulated above can be expected to occur. Also, in many practical cases, much shorter ranges are likely to be of interest.

Figure 2:
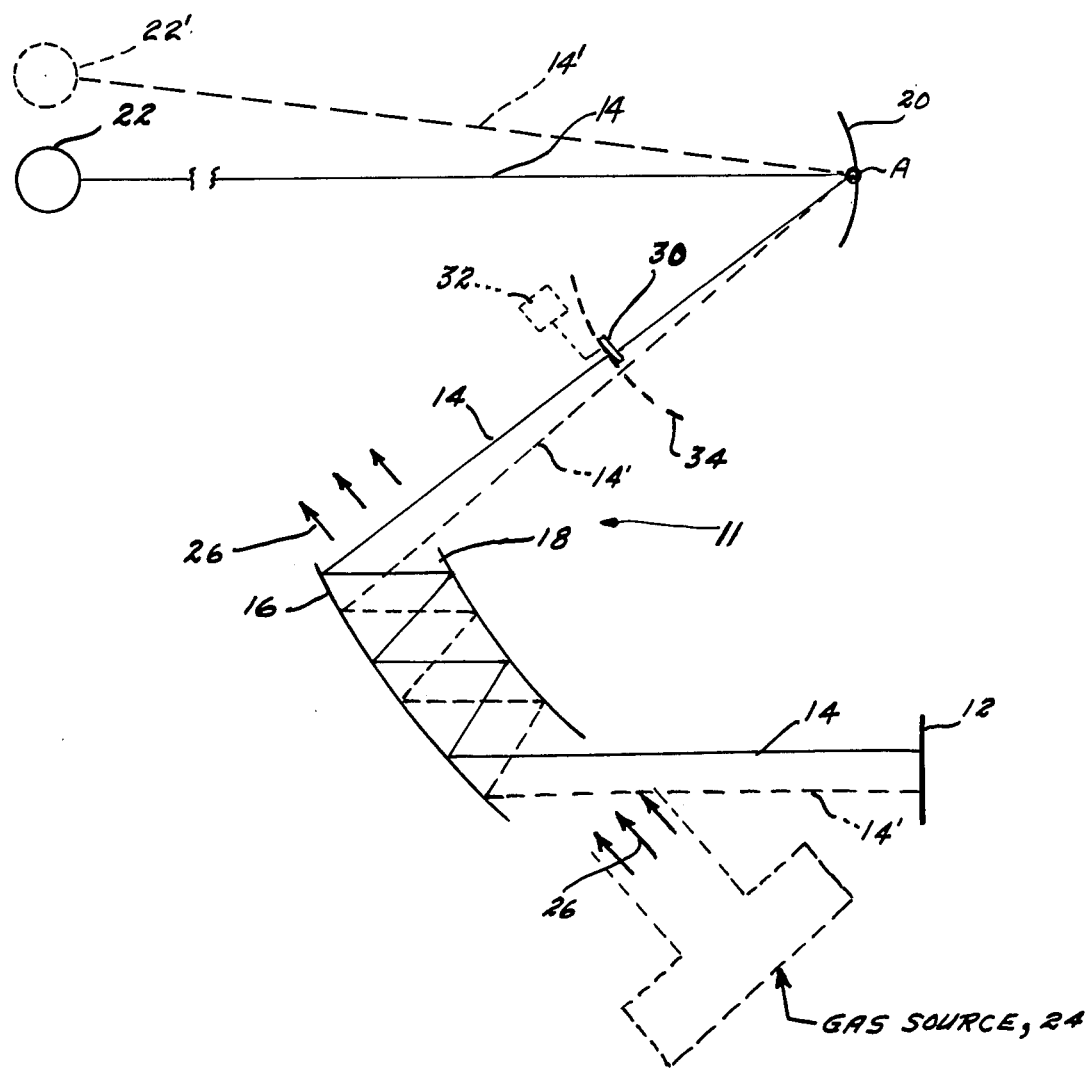
FIG. 2 of the drawing is a schematic representation of an alternate embodiment of the autopointing laser system of this invention.

In an alternate embodiment shown in FIG. 2 of the drawing, wherein the identical elements utilized in FIG. 1 are represented by identical numerals, a movable partially transmissive reflector 30 is disposed in the optical path between the parabolic reflector 16 and the telescope reflector 20. This reflector 30 may be either flat or curved. Any conventional moving means 32 either electrical or mechanical, can be utilized to move reflector 30 in a path shown by the dashed curve 34 along a segment of sphere centered at point A. As the reflector 30 is moved in a path shown by dotted line 34 of FIG. 2, the regenerative path of light represented by either 14 or 14' is formed in a manner described above. With the laser oscillation being achieved over a range of positions based on the movement of reflector 30, as reflector 30 moves its function is to steer the generated laser beam in a manner enabling it to track or follow object 22.

In both embodiments of the instant invention the optical resonator 11 utilizes a movable end reflector which functions to steer the laser beam. However, in the embodiment shown in FIG. 2 of the drawing the automatic tracking advantage achievable by the first embodiment of FIG. 1, wherein the target itself constitutes a reflector, is not achievable, although the range of the system shown in FIG. 2 is greater than the system described in FIG. 1 of the drawing.

Although this invention has been described with reference to particular embodiments it will be understood to those skilled in the art that this invention is also capable of a variety of other embodiments within the spirit and scope of the appended claims.

I claim:

1. An autopointing laser system for use in the tracking and/or detection of a reflective object comprising a first reflective surface forming one end of an optical resonator, a pair of second reflective paraboloidal surfaces juxtaposed to one another and forming a multi-reflective path therebetween, said pair of second reflective surfaces being in optical alignment with said first reflective surface, said first reflective surface and said pair of second reflective surfaces constituting a retro-reflector, a third reflective surface being in optical alignment with said pair of second reflective surfaces, said pair of second reflective surfaces being disposed along respective paraboloidal surfaces having a common axis and a common focus substantially at the center of said third reflective surface and a lasing medium located between said pair of second reflective surfaces whereby when said reflective object is situated in optical alignment with said third reflective surface, said reflective object acts as the other end of said resonator and radiant energy produced within said laser medium is reflected between said first reflective surface, said pair of second reflective surfaces, said third reflective surface and said reflective object thereby allowing a lasing action to take place within said lasing medium as long as said reflective object remains in optical alignment with said third reflective surface.

2. An autopointing laser system as defined in claim 1 wherein said pair of second reflective surfaces are in the form of a pair of paraboloidal mirrors.

3. An autopointing laser system as defined in claim 2 wherein said first reflective surface is a stationary flat reflector.

4. A autopointing laser system for use in the tracking and/or detecting of a reflective object comprising a first reflective surface forming one end of an optical resonator, a pair of second reflective paraboloidal surfaces juxtaposed to one another and forming a multi-reflective path therebetween, said pair of second reflective surfaces being in optical alignment with said first reflective surface, said first reflective surface and said pair of second reflective surfaces constituting a retro-reflector, a third reflective surface being in optical alignment with said pair of second reflective surfaces, said pair of second reflective surfaces being disposed along respective paraboloidal surfaces having a common axis and a common focus substantially at the center of said third reflective surface, a fourth reflective surface optically disposed between said pair of second reflective surfaces and said third reflective surface and being moveable along a segment of a sphere centered at said center of said third reflective surface, means operably connected to said fourth reflective surface for moving said fourth reflective surface, said fourth reflective surface being partially transmissive and forming the other end of said optical resonator and a lasing medium located between said pair of second reflective surfaces in which a lasing action takes place thereby generating a laser beam which is output from said third reflective surface whereby movement of said fourth reflective surface directs said generated laser beam in a manner enabling said laser beam to track and/or detect said reflective object.

5. An autopointing laser system as defined in claim 4 wherein said pair of second reflective surfaces are in the form of a pair of paraboloidal mirrors.

6. An autopointing laser system as defined in claim 5 wherein said first reflective surface is a stationary flat reflector.

* * * * *